United States Patent

[11] 3,584,220

[72] Inventors Sadao Nomura
Tokyo;
Hiroomi Kojima, Hachioji-shi; Akira Sakanoue, Yokohama; Iwao Ogura, Kasukabe-shi; Michio Sekiya, Hachioji-shi, all of, Japan
[21] Appl. No. 629,309
[22] Filed Apr. 7, 1967
[45] Patented June 8, 1971
[73] Assignee Hitachi, Ltd.
Tokyo, Japan
[32] Priority Apr. 9, 1966, July 13, 1966, Sept. 12, 1966
[33] Japan
[31] 41/22349, 41/45419 and 41/59846

[54] OPTICAL COMMUNICATION SYSTEM
11 Claims, 4 Drawing Figs.

[52] U.S. Cl. ........ 250/199
[51] Int. Cl. ........ H04b 9/00
[50] Field of Search ........ 250/199; 325/1, 3, 4, 9

[56] References Cited

UNITED STATES PATENTS

| | | | |
|---|---|---|---|
| 2,345,445 | 3/1944 | Atwood | 250/199 |
| 3,365,572 | 1/1968 | Strauss | 250/199UX |
| 3,433,958 | 3/1969 | Lenzo et al. | 250/199 |
| 3,317,838 | 5/1967 | Ham | 325/31 |

OTHER REFERENCES

J. R. McDermott, Space and Aeronautics, "Transmitters and Receivers for Optical Communications," June 1963, pps. 98—106, Class 250/199.

*Primary Examiner*—Richard Murray
*Assistant Examiner*—Albert J. Mayer
*Attorney*—Craig, Antonelli, Stewart & Hill

ABSTRACT: An optical communication system for use in simultaneous communication between two separate stations A and B, designed so that the light source of the carrier is provided only in one of the stations and means are provided so that the message issued from Station A is derived at Station B from a portion of the carrier light beam received at Station B while the message of Station B is transmitted to Station A on the remainder of the carrier light beam which is returned therefrom to Station A.

INVENTORS
SADAO NOMURA
HIROOMI KOJIMA
AKIRA SAKANOUE
IWAO OGURA
MICHIO SEKIYA

BY Paul M. Craig, Jr.
ATTORNEY

INVENTORS
SADAO NOMURA
HIROOMI KOJIMA
AKIRA SAKANOUE
IWAO OGURA
MICHIO SEKIYA

BY Paul M. Craig, Jr.
ATTORNEY

OPTICAL COMMUNICATION SYSTEM

BACKGROUND OF THE INVENTION

1. Field of the Invention

The present invention relates to optical communication system and more particularly to an optical communication system utilizing, as a carrier, a coherent light beam from a light source such as laser and being designed so that said light beam is modulated with a crystal having an electro-optic effect.

2. Description of the Prior Art

As is well known, oscillation and amplification of light wave has become feasible with the discovery of laser capable of emitting a coherent light beam. Extensive researches are being underway in many parts of the world to develop means to effectively and economically utilize this novel light beam in communication.

In performing simultaneous optical communication between two separate stations by the use of a coherent light beam as the carrier wave, it has been the practice to provide such a carrier light source in each of these two stations so that the messages issued from these stations are transmitted to each other station on their own individual light beams directed to each other station. Therefore, the simultaneous optical communication systems of the prior art required at least two light sources provided at said two stations, respectively.

SUMMARY OF THE INVENTION

It is, therefore, the primary object of the present invention to provide novel means for effecting simultaneous optical communication between two separate stations by the use of a single light source which is installed at one of the two stations. By the employment of this single light source system, both the cost of the manufacture of the apparatus and the maintenance expenses can be greatly curtailed. The employment of this single light source system also eliminates the necessity encountered in the prior art for keeping the light source always in the actuated state so as to be prepared for the calling from either one of the two stations. The single light source system has a further advantage that manmade satellites do not require to carry light sources of their own with them, and this fact contributes greatly to a reduction in both the number of the items, and accordingly the weight, of the equipment to be loaded on the satellites.

Another object of the present invention is to provide a light wave modulation system which is capable of avoiding the interference on the outgoing signal and the incoming signal by each other signal, and which, accordingly, is capable of eliminating the occurrence of trouble such as crosstalk, in order to communicate many informations at the same time.

The present invention attains the foregoing objects by the provision of a light source only in one of the two communicating stations and by the provision of means for enabling the message of the first station to be derived, at the second station, from a portion of the carrier light beam, and for enabling the remainder of the light beam to be used as a carrier light beam on which to transmit a message of the second station to the first station.

The foregoing and other objects as well as the attendant advantages will become more apparent by reading the following description in conjunction with the accompanying drawings.

DESCRIPTION OF THE PREFERRED EMBODIMENTS

Figure 1:
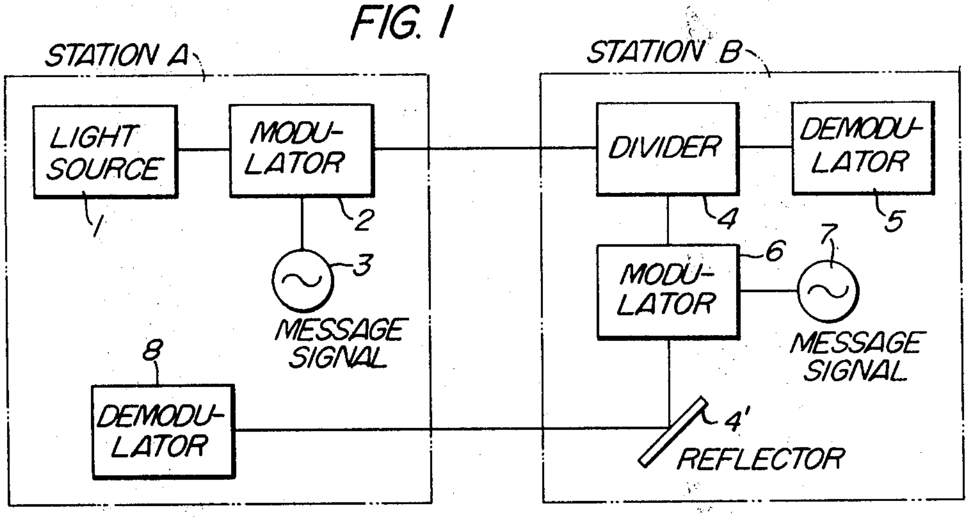
FIG. 1 is a block diagram of an optical simultaneous communication system embodying the present invention.

Referring to FIG. 1 which is a block diagram explaining the principle of the present invention, a coherent light beam emitted from the light source 1 provided at the Station A is linearly polarized and is introduced into a modulator 2 having an electro-optic effect, where a modulated light signal is formed by impressing it to an electric signal which is proportional to a message signal 3 and this modulated-light signal is transmitted to the Station B. The modulated-light signal which carries the message signal and which is transmitted to the Station B is divided by a divider 4 such as a half-mirror. A portion of said modulated-light signal is led to a demodulator 5 where the transmitted message signal is derived. The remainder of the modulated-light signal which has been divided by the divider 4 is led to modulator 6 where this remaining portion of the modulated light signal is modulated again to load said portion of the light signal with a message of the Station B and this loaded portion of the light signal is used as the carrier light beam and reflected by reflector 4′ for transmitting the message of the Station B to the Station A. More specifically, the light signal which has been modulated at the Station B, namely, the output of the modulator, is returned therefrom to the Station A. An arrangement is given in the Station A so that only the message signal 7 is derived by demodulator 8 from the modulated light signal received from the Station B.

Since the present invention is so designed that both of the messages from the Station A and from the Station B are to be loaded on the same light beam emitted from a single light source, it is necessary that the modulation circuits and the demodulation circuits be so constructed that the signals issued from the two stations do not interfere with each other, as shown in the following embodiments.

Description of the present invention will hereunder be made in connection with some of the embodiments of the invention.

Figure 2:
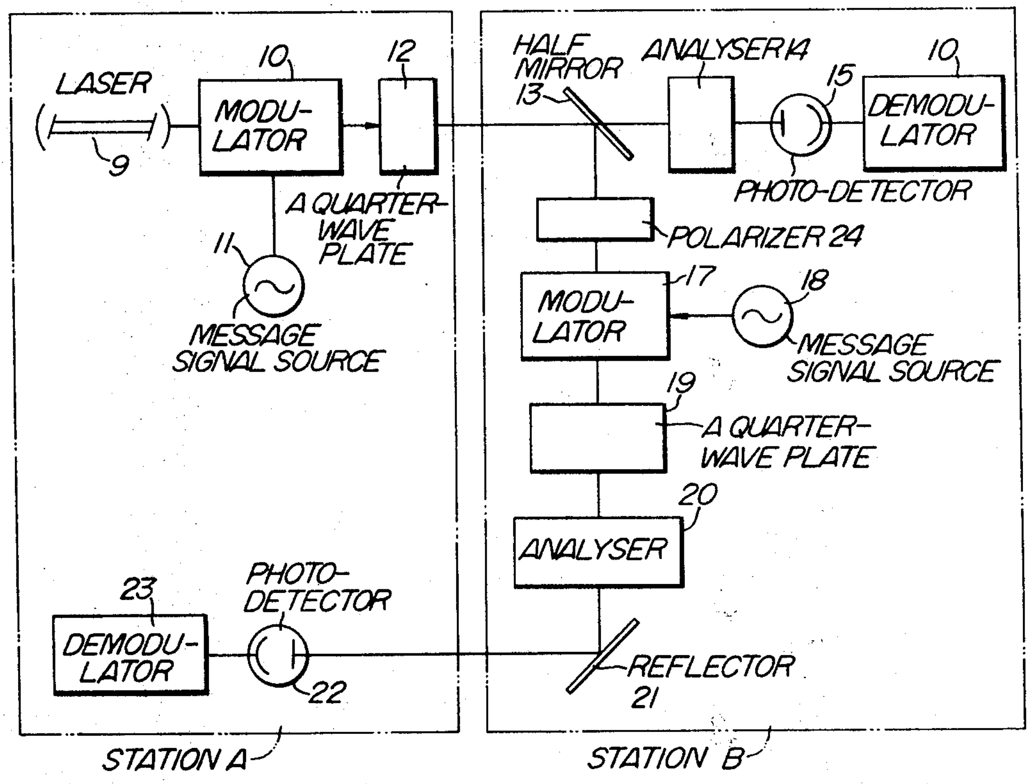
FIGS. 2 through 4 are block diagrams showing modified examples of the present invention.

FIG. 2 is a block diagram showing an example of the present invention. In this example, the relative optical axis relationship between the modulating crystals is effectively arranged to avoid the undesirable interference of each other's signal transmitted from each other station.

In FIG. 2, Station A comprises transmitting means consisting of a light source 9 of a laser, a modulator crystal 10, a message signal source 11, and a quarter-wave plate 12; and a receiving means consisting of a photodetector 22 and a demodulated wave output circuit 23. Station B comprises a light beam divider 13, a photoanalyzer 14, a photodetector 15, a demodulated wave output circuit 16, a photopolarizer 24, a modulator crystal 17, a message signal source 18, a quarter-wave plate 19 and a photoanalyzer 20.

In the aforesaid example, the transmitting and receiving system including the elements from the light source 9 to the modulated-light wave output circuit may consist of any other known system.

The linearly polarized light beam emitted from the light source 9 (in this example, a linearly polarized light beam is obtained directly by the use of a light beam oscillator having Brewster window. However, it may be obtained through a polarizing plate) is applied to a crystal having an electro-optic effect with an angle of 45 degrees relative to the induced electro-optic axes $x$ and $y$ of the modulator crystal, with the result that the light beam is divided thereat into the following two components which are identical in amplitude and which have vibration planes intercepting each other at right angle:

$$E_x = A \sin \Omega t. \quad (1)$$

$$E_y = A \sin \Omega t. \quad (2)$$

wherein: $\Omega$ represents the angular frequency of the light wave, and $A$ represents the amplitude of the light wave.

These two components $E_x$ and $E_y$ are modulated in said crystal 10 with a voltage proportional to a message signal, and these two components are emitted from the crystal 10 as:

$$E_x = A \sin (\Omega t + \theta) \quad (3)$$

$$E_y = A \sin (\Omega t \theta) \quad (4)$$

wherein: $\theta$ represents the phase difference portional to the voltage of the message signal.

The linearly polarized light wave, which is polarized toward either the optical axis $x$ or the optical axis $y$ of the crystal in the direction of the axis Z of the Z-cut crystal plate consisting of a KDP or an ADP crystal having an electro-optic effect, will acquire, by the application of a voltage $V_z$ in the direction of Z axis, the following relationship:

$$\theta = 2\pi/\lambda\ \eta_o^3\ \gamma\ V_z \quad (5)$$

wherein: $\gamma$ represents an electro-optic constant, and $\eta_o$ represents an index of refraction of ordinary rays.

In order to linearly modulate the intensity of the aforesaid outputs, or in other words, in order to give each of the phases of $E_x$ and $E_y$ an additional $\pi/2$, there is provided a quarter-wave plate 12. This quarter-wave plate 12 need not always be provided at the transmitting station, but it may be provided at the receiving station.

The signal whose intensity has been modulated linearly is transmitted to the receiving station. However, the two components $E_x$ and $E_y$ at the receiving station are expressed as:

$$E_x = A \sin(\Omega t + \theta) \quad (6)$$

$$E_y = A \cos(\Omega t - \theta) \quad (7)$$

One-third of the power of the light is transmitted, through a half-mirror which constitutes a divider, to the demodulation side. Accordingly, the components of the light wave incident to the photoanalyzer 14 will be:

$$E_x = \frac{1}{\sqrt{3}} A \sin(\Omega t + \theta)$$

$$E_y = \frac{1}{\sqrt{3}} A \cos(\Omega t - \theta)$$

By arranging the direction of polarization of the photoanalyzer 14 so as to be orthogonal to the direction of polarization of the laser light source, there is derived, at the output side of the photoanalyzer, a signal which is expressed by:

$$\frac{1}{\sqrt{3}} A \sin\left(\theta + \frac{\pi}{4}\right) \sin(\Omega t + 45°)$$

This signal is derived, through a photodetector 15 and a demodulated wave output circuit 16, as being the signal transmitted from the Station A.

The remaining two-thirds of the respective components which have been divided by the half-mirror are transmitted, after passing through a polarizer 24, a modulator 17, a quarter-wave plate 19 and a photoanalyzer 20, to the Station A. More specifically, the polarizer 24 is installed with an angle at which exclusively the component $E_x$ alone is passed therethrough. The modulator 17 consists, like the modulator 10 at the Station A, of a crystal such as KDP and ADP which has an electro-optic effect. Furthermore, the axis $x$ of this crystal is arranged so as to be in alignment with the polarization direction of the component $E_x$.

The light beam which has entered into the modulator crystal 17 is divided into the following two components which are same in volume and which have their vibration planes passing through the optical axes (represented by the axis $x'$ and the axis $y'$ which are angled at 45 degrees relative to the axis of polarization of the component $E_x$, respectively) of the crystal 17:

$$E_{x'} = \frac{1}{\sqrt{2}} \cdot \frac{\sqrt{2}}{\sqrt{3}} A \sin(\Omega t + \theta) \quad (8)$$

$$E_{y'} = \frac{1}{\sqrt{2}} \cdot \frac{\sqrt{2}}{\sqrt{3}} A \sin(\Omega t + \theta) \quad (9)$$

By applying a voltage proportional to the message signal source 18 of the Station B to said crystal, the output of the modulator crystal 17 will be:

$$E_x = \frac{1}{\sqrt{3}} A \sin(\Omega t + \theta + \theta') \quad (10)$$

$$E_{y'} = \frac{1}{\sqrt{3}} A \sin(\Omega t + \theta - \theta') \quad (11)$$

wherein: $\theta$ represents a phase proportional to the voltage of the message signal. Here, also, linear intensity modulation is performed, and as a result, $E_x$ and $E_y$ are given a phase difference of 90 degrees therebetween. In the present example, this is done by placing a quarter-wave plate 19 on the output side. Accordingly, the light wave components emitted from the quarter-wave plate will be:

$$E_{x'} = \frac{1}{\sqrt{3}} A \sin(\Omega t + \theta + \theta') \quad (12)$$

$$E_{y'} = \frac{1}{\sqrt{3}} A \cos(\Omega t + \theta - \theta') \quad (13)$$

By installing a photoanalyzer 20 on the output side of the quarter-wave plate so as to form a Nicol's prism in combination with a polarizer 24, the output of the photoanalyzer 20 will be:

$$\frac{1}{\sqrt{3}} A \sin\left(\theta' + \frac{\pi}{4}\right) \cos(\Omega t + 45° + \theta)$$

and this output is transmitted over to the Station A.

Now, the electric output, which is emitted from the photodetector 22 and which can vary depending upon the message signal from the station A and whose intensity changes with the value of $\theta'$ and which is irrelevant to $\theta$, can derive exclusively the message signal transmitted from the Station B. It should be clearly understood to those skilled in the art that the aforesaid quarter-wave plate 19 and the photoanalyzer 20 of the Station B may be placed on the input side of the photodetector of the Station A.

In the example of FIG. 2, the optical elements contained in the system are elaborately arranged so as to have a particular axial relationship therebetween so that the outgoing and incoming signals do not interfere each other and cause undesirable trouble such as crosstalk. In the example illustrated in FIG. 3, the Station A is provided with the arrangement to effect double modulation of the signal with a subcarrier, while in the Station B, the signal is directly modulated.

Figure 3:
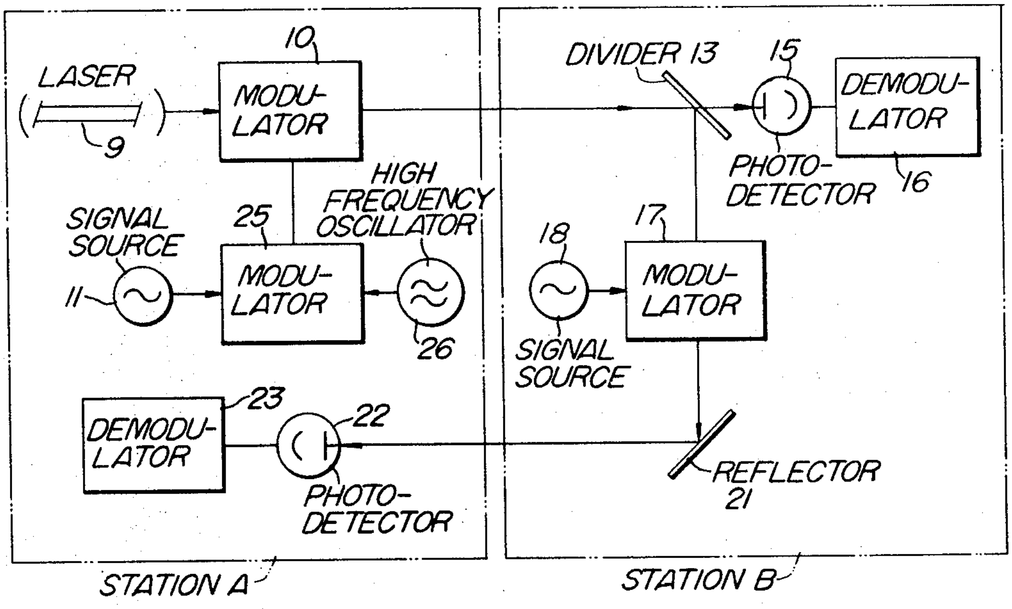

In FIG. 3, reference numerals 9 through 23 represent like parts which are shown in FIG. 2 and which have identical functions to those of FIG. 2. Numeral 9 represents a laser light source. Numeral 10 represents a modulator consisting of a crystal having an electro-optic effect. Numeral 11 represents a message signal source. Numeral 13 represents a photodivider. Numeral 15 represents a photodetector. Numeral 16 represents a modulated wave output circuit. Numeral 17 represents a modulator having an electro-optic effect. Numeral 18 represents a message source installed in the Station B. Numeral 22 represents a photodetector. Numeral 23 represents a modulated wave output circuit.

The example shown in FIG. 3 is so designed that the signal in the Station A is modulated by a modulator 25 with a subcarrier coming from a high frequency oscillator 26, and that the modulated signal is used to modulate the intensity of the light wave in the modulator 10. In other words, the signal is double-modulated with a subcarrier.

More detailed description will now be made on the example of FIG. 3. Let us designate that the intensity of the light beam emitted from the laser power sources as LI; the output of the message signal of the Station A as $f(t)$, wherein $t$ represents time; the oscillation angle frequency as $\omega$; and the amplitude as B. After an amplitude modulation (modulation of any other appropriate type may be adopted), the output of the modulator 25 will be.

$\{1+mf(t)\}\sin\omega t$ wherein: $m$ represents a modulation factor of the modulator 25. Accordingly, by modulating, in the modulator 10, the light wave from the light source 9 with this modulated signal, the output $I$ will be:

$$I=I_o[1C\sin\omega t\{1+mf(t)\}] \quad (14)$$

wherein: $C=B/I_o$ The above signal is transmitted to the Station B. The signal received at the Station B is divided by the divider 13, and one portion of the divided signal, namely, the signal of $\{1+mf(t)\}\sin\omega t$, is derived by the photodetector while the $f(t)$ is derived by the demodulated wave output circuit 16.

The remainder of the components after being divided by the divider is led to the modulator 17, where these remaining portions of components are modulated directly by the message signal $f'(t)$ of the Station B. Accordingly, the output light beam $I'$ of the modulator will be:

$I'=kI_o[I+C\,mf(t)\sin\omega t]\{1+m'f'(t)\}$ wherein: $k$ represents a constant having a relation of $k<1/2$; and $m'$ represents a modulation factor in 11. This output light beam is transmitted to the Station A. However, the $I'$ in the above equation is expressed as follows:

$m'f'(t)+C\sin\omega t+mf(t)\,C\sin\omega t+m'f'(t)\,C\{1+mf(t)\}\sin\omega t$

Since the demodulation circuit of the Station A is not adapted to respond to high frequency $\omega$, the components which contain the component of $\sin\omega t$ are eliminated, and thus, only the component of $m'f'(t)$, namely, only the message signal of the Station B can be derived.

According to the system illustrated in FIG. 3, an effect similar to that obtained from the example shown in FIG. 2 is obtained. In addition, there is a further advantage that the procedure of properly adjusting the angle of, for example, the polarizer at Station B can be dispensed with. It is to be understood that while in this example of FIG. 3, the double modulation at the Station A is performed in the form of amplitude modulation, it may be done also in the form of frequency modulation.

Figure 4:
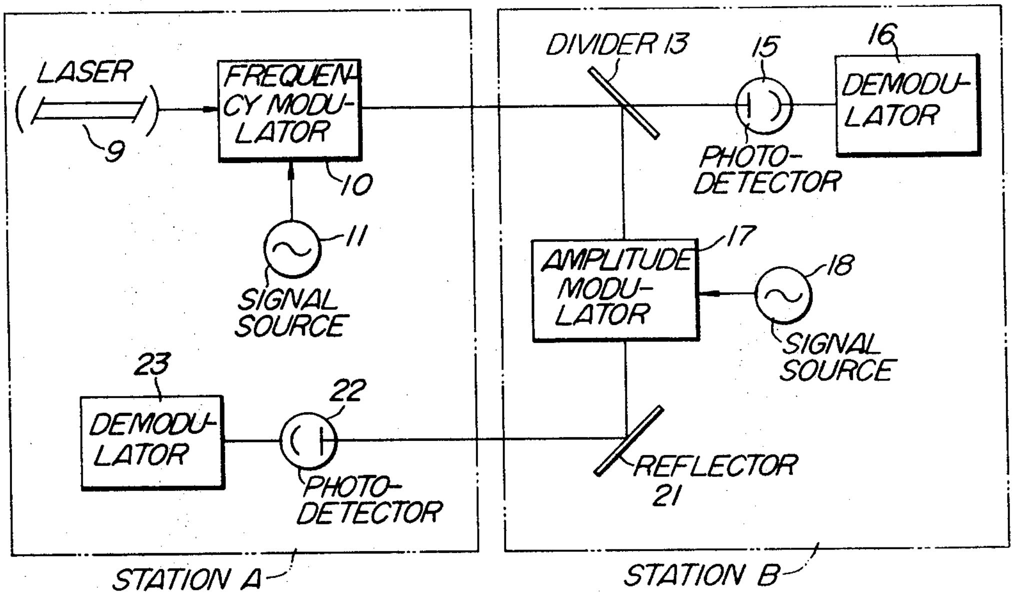

FIG. 4 is a block diagram illustrating still another embodiment of the present invention. In this embodiment, the interference between the incoming and the outgoing signals carried on the same light beam is eliminated by the combination of a modulation system of the Station A with another modulation system of the Station B which is different in type from that of the former station.

In FIG. 4, the blocks indicated by the reference numerals 9 through 23 represent like parts having functions similar to those indicated by like reference numerals in FIG. 2. An arrangement is given so that the linearly polarized light wave emitted from a laser light source 9 enters into the KDP crystal (which may be substituted, of course, by any material having an electro-optic effect) constituting a modulator 10 in such manner that the incident beam is in parallel with either the optical axis $x$ or the optical axis $y$ of the crystal. In the crystal, the phase or frequency of the light wave is modulated with a voltage proportional to the message signal 11. The resulting output signal is transmitted to the Station B. The modulated signal received by the Station B is divided by a divider 13, and one portion of the divided signal is transformed into a communication output signal by a photodetector 15. This output is applied to a receiver 16 of a known type such as the microwave signal receiver or milliwave signal receiver and after it has been demodulated, the message of the Station A is derived.

The remainder portion of the divided signal which has been modulated of its frequency or phase is applied to a photomodulator 17, where modulation of light wave amplitude or pulse of said portion of the signal is performed with a voltage proportional to the message signal 18 of the Station B. The optical output of the modulated signal is transmitted therefrom, through means including a reflector 21, to the Station A.

In the Station A, the light beam received from the Station B is transformed into an electric signal by the photodetector 22, and further, only the low frequency signal from the Station B can be derived by means of a demodulated wave output circuit.

According to the system of this example, the message signal issued at the station where the light source is provided is modulated of its phase or frequency, and therefore, there is an advantage that even in case the modulator is of a modulation characteristic which is nonlinear, the modulated light wave which is transmitted back, on the same light beam, from the other of the pair stations is hardly affected by the initial signal modulation.

We claim:

1. An optical communication system between two separate stations A and B in which:

a. the station A is provided with:

a light source for emitting a carrier, a modulator for modulating the light wave emitted from said carrier light source, means for transmitting the output of said modulator to the station B;

b. the station B is provided with:

means for dividing the modulated light signal transmitted from said station A, means for deriving (demodulating) the message of the station A from a divided portion of said signal, a message signal source of the station B, means for modulating a portion of the remainder of said divided modulated light signal with the message signal of the station B to use said divided modulated light signal as the carrier light source, and means for transmitting said modulated signal to said station A; and c. the station A is further equipped with:

means for demodulating exclusively the message of the station B from said modulated light signal received from said station B.

2. An optical communication system between separate stations A and B in which;

a. the station A is provided with:

a carrier light source, means for obtaining a linearly polarized light wave from said light source, a message signal source, a light-modulator consisting of a crystal having an electro-optic effect for modulating said linearly polarized light wave emitted from said light source with a message signal of said message signal source, and demodulating means for deriving the signal of the station B from the modulated light wave received from the station B;

b. the station B is provided with:

means for dividing the modulated light signal transmitted from the station A, means for demodulating the message of the station A from a portion of said light signal divided by said dividing means, a first photoanalyzer adapted to pass therethrough only one of the polarized two components of another portion of the said divided light signal, said two components being so separated by passing said another portion of the divided light signal through said crystal having an electro-optic effect, a message signal source of the station B, a light-modulator consisting of a crystal having an electro-optic effect for modulating the output light signal of said photoanalyzer with said message signal of the station B to use said output light wave as the carrier light source, and means for transmitting the resulting modulated light signal emitted from said modulator.

3. An optical communication system between two separate stations A and B according to Claim 2, wherein a quarter-wave plate is provided between the output side of the light-modulator of the station A and the path of light beam of the demodulation means of the station B for giving a phase difference of 90 degrees to the two polarized light components so separated in optical axes $x$ and $y$ through said light-modulator of the station A consisting of a crystal having an electro-optic effect, and another quarter-wave plate is provided between the output side of the light-modulator of the station B and the demodulation means of the station A, said another quarter-wave plate being adapted to give a phase difference of 90 degrees to the polarized light components which have been separated into optical axes $x$ and $y$ by the modulator crystal of the station B.

4. An optical communication system between two separate stations A and B in which;

a. the station A is provided with:

a carrier light source, a message signal source, a high frequency oscillator, a first modulator for modulating a signal oscillated by said oscillator with a message signal of said message signal source, a second modulator for modulating the light wave emitted from said carrier light source, means for transmitting the resulting modulated light signal emitted from said second modulator to the station B located at a spaced site, and a demodulating means for deriving the message signal wave of the station B from a modulated light wave received from the station B, and b. the station B is provided with:

means for dividing the modulated light wave transmitted from the station A, a message source of the station B, demodulating means for deriving the message signal of the station A from a portion of the signal divided by said dividing means, a modulator for modulating another portion of said divided light signal with said message signal of the station B to use said another portion of said divided light signal as the carrier light source, and means for transmitting the modulated output light signal of said modulator to the station A.

5. An optical communication system between two separate stations A and B in which;

a. the station A is provided with:

a carrier light source, a message signal source, a modulator consisting of a crystal having an electro-optic effect and adapted to pass the linearly polarized light wave emitted from said light source through said crystal in a direction parallel with one of the polarization directions of the optical axis of said crystal and adapted to modulate the frequency or the phase of said light wave with said message signal, means for transmitting said modulated output light signal of said modulator to the station B located at a spaced communication site, and demodulating means for deriving the message signal of the station B from the modulated light signal transmitted from the station B, and b. the station B is equipped with:

means for dividing the modulated light signal transmitted from the station A, a demodulating circuit for deriving the message of the station A from one portion of the divided signal, a message source of the station B, a modulator for modulating the amplitude of another portion of said divided light signal with said message signal to use said another portion of said divided light signal as the carrier light source, and means for transmitting the resulting light signal which has been modulated of its amplitude to the station A.

6. The apparatus of claim 1, wherein said light is coherent light.

7. The apparatus of claim 2, wherein said light is coherent light.

8. The apparatus of claim 4, wherein said light is coherent light.

9. The apparatus of claim 5, wherein said light is coherent light.

10. A method of communicating between two separate stations comprising:

transmitting an energy beam of coherent light modulated with a first information signal from a first station to a second station;

retransmitting a portion of said modulated energy beam, which has been modulated at said second station with a second information signal, to said first station from said second station;

detecting said first and second information signals exclusively at said second and first stations, respectively.

11. The method of claim 10, wherein said light is polarized.